Figure 3:
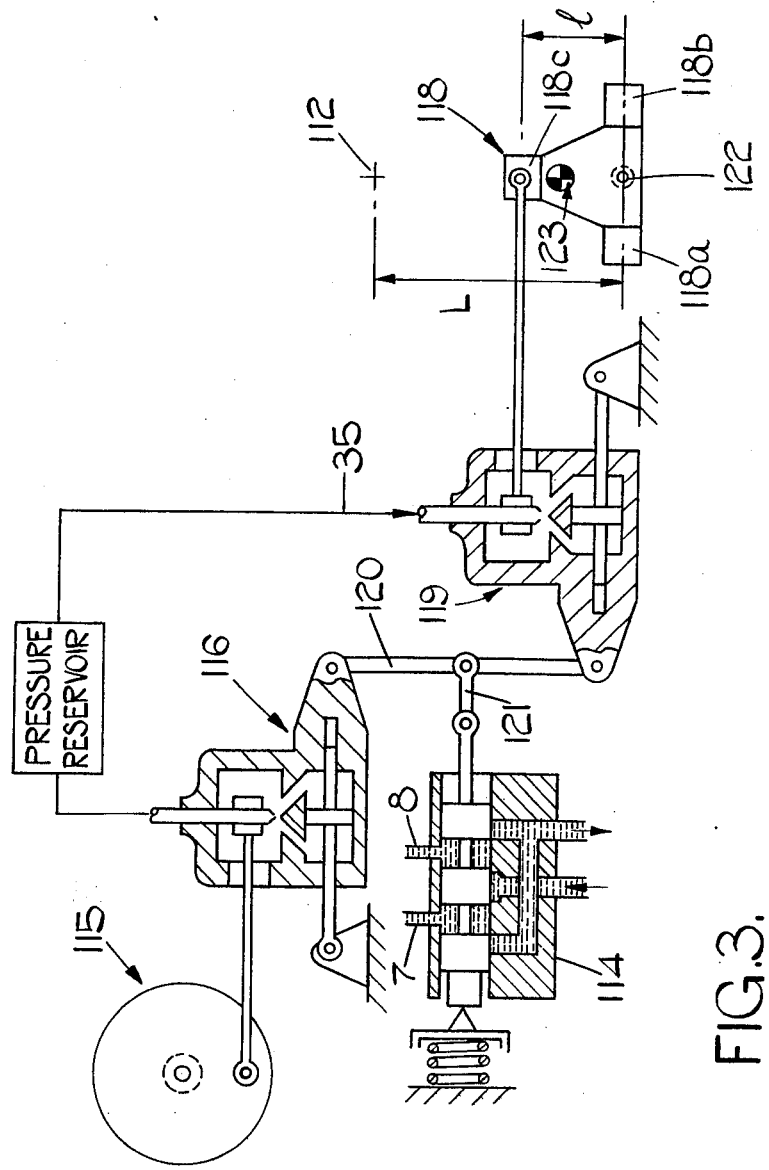

United States Patent [19]
Glaze

[11] 4,069,767
[45] Jan. 24, 1978

[54] PNEUMATICALLY CONTROLLED HYDROMECHANICAL RAILWAY CAR STABILIZING APPARATUS

[75] Inventor: Stanley George Glaze, Brierley Hill, England

[73] Assignee: Lucas Aerospace, Birmingham, England

[21] Appl. No.: 598,942

[22] Filed: July 25, 1975

Related U.S. Application Data

[63] Continuation of Ser. No. 412,628, Nov. 5, 1973, abandoned.

[51] Int. Cl.² .......................... B61F 3/00; B61F 5/12; B61F 5/24; B61F 5/44
[52] U.S. Cl. ................. 105/164; 105/199 A; 105/210
[58] Field of Search ............... 105/164, 182 R, 197 R, 105/199 R, 199 A, 210

[56] References Cited

U.S. PATENT DOCUMENTS

| | | | |
|---|---|---|---|
| 2,474,471 | 6/1949 | Dolan | 105/164 |
| 2,520,944 | 9/1950 | Lynn et al. | 105/164 X |
| 2,823,879 | 2/1958 | Smith et al. | 244/83 |
| 3,717,104 | 2/1973 | Law et al. | 105/182 R X |
| 3,789,769 | 2/1974 | Strohmer et al. | 105/164 |

FOREIGN PATENT DOCUMENTS

| | | | |
|---|---|---|---|
| 2,096,211 | 1/1972 | France | 105/164 |
| 2,100,262 | 2/1972 | France | 105/164 |
| 759,126 | 11/1953 | Germany | 105/164 |

Primary Examiner—Robert J. Spar
Assistant Examiner—Howard Beltran

[57] ABSTRACT

A control system for a stabilizing apparatus for a rail vehicle body, which is tiltable on a bogey by means of jacks, comprises a lateral accelerometer and an angular accelerometer mounted on the vehicle body, two servo-mechanisms respectively responsive to operation of the lateral and angular accelerometers, and a control valve for the tilting jacks, the control valve being coupled to output members of the servo-mechanisms so that tilting movement of the vehicle body in response to operation of the lateral accelerometer is sensed by the angular accelerometer so as to urge the control valve in a direction to oppose the aforesaid tilting movement.

14 Claims, 3 Drawing Figures

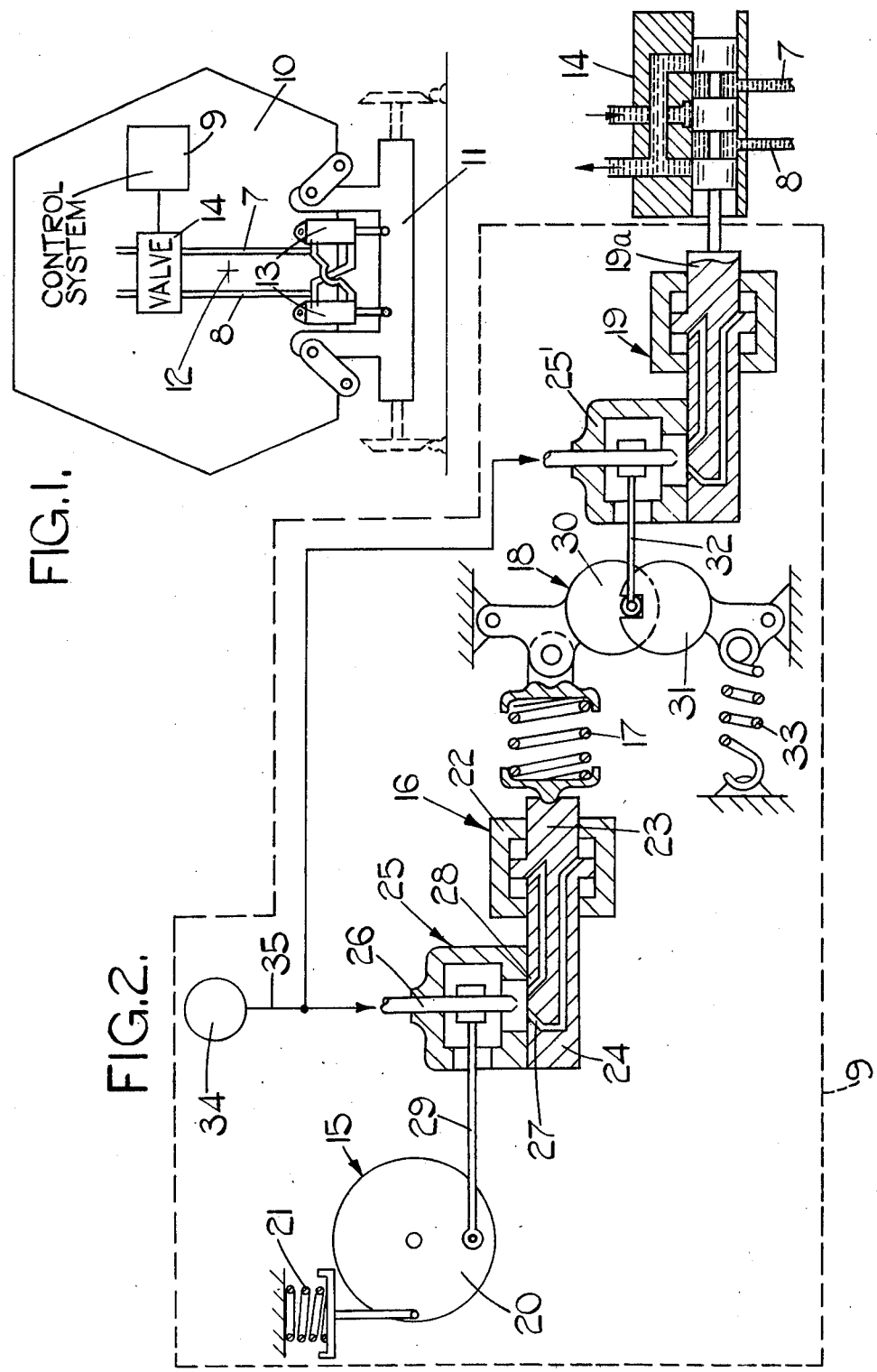

PNEUMATICALLY CONTROLLED HYDROMECHANICAL RAILWAY CAR STABILIZING APPARATUS

This application is a continuation of copending application Ser. No. 412,628, filed Nov. 5, 1973, now abandoned.

This invention relates to an hydromechanical control system for a rail vehicle stabilising apparatus.

It has already been proposed to utilise a control system employing a pair of electrical accelerometers which measure the lateral acceleration of the vehicle body at two different heights and the signals from these are electronically processed to obtain signals corresponding to the lateral acceleration of the centre of mass of the body and the angular velocity of the body about a longitudinal axis. These signals in turn are used to control jacks whereby the body is tilted to reduce the lateral acceleration (referred to the body) to zero whilst controlling the angular velocity of the body to minimize the discomfort of the passenger.

Such an electronic system is of necessity complex and may not prove sufficiently reliable to use in a rail vehicle environment. In addition the system must include, as a final stage, an electrically actuable valve controlling the supply of liquid to the tilting jacks and this valve may also prove to be a source of unreliability. It is an object of the invention to provide a control system in which no electrical transducers or complex circuits are utilised.

According to the invention a control system for a stabilising apparatus for a rail vehicle body which is provided with jacks for controlling the tilt of the body with respect to a bogey, comprises the combination of an angular accelerometer comprising a balanced mass, a lateral accelerometer first and second hydro-mechanical servo-mechanisms having input members driven by said angular and lateral accelerometers respectively and output members, a control valve for said tilting jacks, means coupling the output members of said servomechanisms to a movable part of said control valve and arranged so that in use, lateral acceleration sensed by the lateral accelerometer causes the movable part of the control valve to be moved in one direction to cause angular movement to be applied to the body by the tilting jacks, such angular movement being sensed by the angular accelerometer to cause movement of the movable part of the control valve in the opposite direction.

FIG. 1 is a diagramatic representation of a rail vehicle body incorporating a control system, and FIGS. 2 and 3 are diagramatic representations of alternative examples of the control system indicated in FIG. 1.

As shown in FIG. 1 the system is used for the stabilisation of the body 10 of a rail vehicle on wheeled bogeys 11. The body 10 is suspended on a linkage which is very much simplified in the drawing and which, in fact, permits damped bodily movement of the body 10 in a vertical direction as well as tilting of the body about a horizontal roll axis 12. A pair of body tilting jacks 13 are each pivotally secured to the body 10 and bogey 11 for controlling the tilt of the body 10 relative to the bogey 11 and these jacks 13 have their ports cross connected as shown to allow liquid to pass from each end of one jack to the opposite ends of the other jack during movement of the body 10.

A valve 14 is mounted on the body 10 with its associated control system 9 to determine the liquid pressures applied to the ends of the jacks 13. The valve 14 is responsive to axial movement of a control member to apply an operating pressure to one of a pair of passages 7, 8 and connect the other of the passages to a return line.

As shown in FIG. 2 of the control system includes an angular accelerometer 15 which provides an input signal to a first servo-mechanism 16, later to be described. The output of the servo-mechanism 16 is coupled via a spring 17 to a lateral accelerometer 18, which controls a second servomechanism 19, the mechanisms 16, 19 being similar. The movable part of the valve 14 is driven by the output piston 19a of the servo-mechanism 19.

The accelerometer 15 comprises a balanced mass 20 which is pivotally mounted on torsion bearings for angular movement about an axis through its centre of mass. A spring arrangement, indicated at 21, acts through a link on the mass 20 principally to take up any backlash in the system. The servo-mechanism 16 which is driven by the angular accelerometer 15, comprises a fixed cylinder 22 in which a piston 23 is slidable. On the rod 24 of piston 23 is a pilot valve arrangement 25 which is of the kind including a resiliently flexible nozzle pipe 26 arranged to direct a jet of fluid towards a divider between two passages 27, 28 connected respectively to spaces on opposite sides of the piston 23. The pipe 26 is coupled to the accelerometer mass 20 by a connecting rod 29. Direction of the pipe 26 towards one of the passages 27, 28 causes an increase of pressure in that passage and on the side of piston 23 with which that passage communicates. Air on the other side of the piston is vented via the other passage and an opening in the valve body. Pipe 26 is supplied with air from a pressurized reservoir 34 via a passage 35.

The incorporation of piston rod 24 into pilot valve 25 provides a feed-back arrangement, whereby the servo-mechanism 16 operates in known manner to cause the piston 23 to follow the movements of the rod 29, which constitutes the input member of the servo-mechanism 16. Servo-mechanism 16 provides a high gain in terms of the velocity of the piston 23 per unit displacement of nozzle 26. It is possible to ensure that the effect of the servo-mechanism 16 is to apply a pure damping force to the input rod 29 without any damping effects arising from fluid viscosity being involved. Since servo-mechanism 16 acts as an integrator of an angular acceleration signal from accelerometer 15, the displacement of the piston 23 from its rest position is directly proportional to the angular velocity of the vehicle body 10 about its roll axis 12.

The lateral accelerometer comprises a pair of masses 30 and 31 which are pivotally mounted on spaced horizontal axes in the same vertical plane. The two masses 30 31 are identical and, at rest, the centres of masses thereof lie on said vertical plane between the pivot axes. As shown the two masses 30, 31 are coupled together at a location equidistant from their pivotal mountings, and are also coupled to a connecting rod 32 which forms the input member of the second pilot valve 25' which is similar to pilot valve 25. The output of pilot valve 25' is connected to the servo-mechanism 19, which is similar to the mechanism 16. As a result, provided that the lateral accelerometer 18 is mounted on the vehicle body in the vicinity of the roll axis 12 angular movement of the body will have no net effect thereon.

The spring 17 couples the piston 23 to the mass 30 and a second anti-backlash spring 33 acts on the other mass 31. The piston of the servo-mechanism 19 is connected to the movable part of the valve 14 and the displacement of the valve movable part follows the displacement of the input rod 32. This input displacement is dependent on two factors, namely the lateral acceleration and the position of the piston 23.

In use, when the vehicle is rounding a bend the first effect felt by the control system will be a lateral acceleration displacing the rod 32 for example to the right as viewed in FIG. 1. As a result the tilt jacks 13 are actuated to tilt the body 10 in an anti-clockwise direction. This angular movement of the body 10 is sensed by mass 20 which tends to remain stationary as the body tilts thereby causing displacement of the piston 23 to the left by a distance proportional to the instantaneous angular velocity of the body 10. This has the effect of decreasing the displacement of the rod 32 and hence of the movable part of the valve 14. On a curve of constant radius the system will seek a new equilibrium position for the body 10 in which there is no lateral acceleration in the frame of reference of the car.

In the modified form of the control system shown in FIG. 3 the two accelerometers are denoted by the reference numerals 115 and 118 and their respective servo-mechanisms by the numerals 116 and 119. As before, the angular accelerometer 115 is a balanced mass angularly movable on torsion bearings about an axis through its centre of mass. The lateral accelerometer 118 is, however, an assembly of three masses on a pivoted light triangular frame with two of the masses 118$a$ and 118$b$ at the same horizontal level as torsion bearings 122 for the frame and the third mass 118$c$ vertically above the axis of the bearings 122. With such an arrangement the centre of mass, indicated at 123, lies above the pivot axis and by correctly choosing the moment of inertia of the assembly in relation to the distance L between the pivot axis and the vehicle roll axis 112 the two effects of rolling motion, namely the tendency for the accelerometer assembly 118 to turn in one direction relative to the vehicle body, as a result of the angular inertia of the assembly 118, and in the other direction as a result of the lateral acceleration caused by the rolling motion, can be made to cancel out. The necessary condition for this is $$I = M(Ll - l^2)$$

where I is the moment of inertia of the assembly 118 excluding the mass 118$c$, M is the mass of the mass 118$c$, $l$ is the height of the centre of mass of the mass 118$c$ above the pivot axis 122 and L is the height of the roll axis 112 above the pivot axis 122.

With such an arrangement, therefore, the lateral accelerometer 118 can be disposed at a low position beneath the normal floor level of the vehicle body and will not obstruct any passages etc.

The servo-mechanisms 116 and 119 are essentially the same as the servo-mechanisms 16 and 19 of FIG. 1 except that the pistons are fixed and the cylinders movable, the pilot valves being mounted on the cylinder. The input member of the servomechanisms 119 is coupled to the third mass 118$c$.

Valve 114 is similar to valve 14 previously discussed. A pressure reservoir is provided to supply air to servo-mechanisms 116 and 119 through passage 35.

In FIG. 2, however, the outputs of the two servo-mechanisms 116 and 117 are connected to the opposite ends of a lever 120 with a link to the valve 114 connected to this lever intermediate its ends. Thus, as before, the main controlling parameter is the lateral accelerator, but, as before, there is a negative feedback of body angular velocity to stabilise the control system and to ensure that excessively fast rates of roll, causing discomfort to the passengers, are avoided.

Each accelerometer/servo-mechanism combination provides its own noise filter having a precise cut off frequency. In this way hydraulic losses caused by needless high frequency variations in the servo-mechanisms and in the final valve/jack stage which have no beneficial effect on passenger comfort are avoided.

I claim:

1. A control system for a stabilising for a rail vehicle body which is provided with jacks for controlling the tilt of the body with respect to a bogey, comprising the combination of an angular accelerometer which is responsive to the angular velocity of the body about the longitudinal axis thereof and which comprises a balanced mass, a lateral accelerometer which is responsive to acceleration of said body in a directional normal to said longitudinal axis, first and second hydro-mechanical servo-mechanisms having input members driven by said angular and lateral accelerometers respectively and output members, a control valve for selectively applying a fluid pressure to said tilting jacks, means, responsive to movement of said output members of said servo-mechanisms, for moving a control part of said control valve so that in use, lateral acceleration sensed by the lateral accelerometer causes the movable parts of the control valve to be moved in one direction to cause angular movement to be applied to the body by the tilting jacks, such angular movement being sensed by the angular accelerometer to cause movement of the movable part of the control valve in the opposite direction.

2. A control system as claimed in claim 1 in which said first servo-mechanism comprises a first pilot valve operable by said angular accelerometer to provide servo control signals, and a first actuator responsive to said control signals to move the output member of said first servo mechanism, said first pilot valve also being responsive to movement of said output member to vary said control signals so as to oppose said movement.

3. A control system as claimed in claim 1 in which said angular accelerometer masses is mounted for pivotal movement about its centre of mass.

4. A control system as claimed in claim 3 in which said angular accelerometer mass is mounted on torsion bearings.

5. A control systems as claimed in claim 1 in which said lateral accelerometer comprises a pair of identical masses pivotally mounted on spaced horizontal axes in the same vertical plane, said pair of masses being coupled together at a location intermediate their pivotal axes.

6. A control system as claimed in claim 5 in which said second servo-mechanism input member is coupled to said pair of masses at said location intermediate their pivotal axes.

7. A control system as claimed in claim 5 in which the output member of said first servo-mechanism is operatively connected to one of said identical masses.

8. A control system as claimed in claim 7 which includes a spring engaged between the output member of said first servomechanism and said one mass, to urge said servo-mechanism input member in a first direction.

9. A control system as claimed in claim 8 which includes a further spring acting on said lateral accelerometer to urge the output member of said first servo-mechanism in a second direction.

10. A control system as claimed in claim 1 in which said lateral accelerometer comprises a support pivotally mounted on the vehicle body, two masses carried on said support in the plane of the pivotal axis thereof and spaced from said pivotal axis on opposite sides thereof, and a third mass carried on said support vertically above the pivotal axis thereof.

11. A control system as claimed in claim 10 in which the input member of said second servo-mechanism is coupled to said third mass.

12. A control system as claimed in claim 10 in which said output members are coupled to opposite ends of a lever, said movable part of the control valve being coupled to said lever intermediate the ends thereof.

13. A control system as claimed in claim 1 in which said lateral accelerometer comprises an arrangement of unbalanced masses such that the effects of angular acceleration on said unbalanced masses are cancelled out.

14. A control system for a stabilising apparatus for a rail vehicle body which is provided with jacks for controlling the tilt of the body with respect to a bogey, comprising the combination of an angular accelerometer which is responsive to the angular velocity of the body about the longitudinal axis thereof and which comprises a balanced mass, a lateral accelerometer, first and second hydromechanical servo-mechanisms having input members driven by said angular and lateral accelerometers respectively and output members, a control valve for selectively applying a fluid pressure to said tilting jacks, means coupling the output members of said servomechanisms to a movable part of said control valve and arranged so that, in use, lateral acceleration sensed by the lateral accelerometer causes the movable part of the control valve to be moved in one direction to cause angular movement to be applied to the body by the tilting jacks, such angular movement being sensed by the angular accelerometer to cause movement of the movable part of the control valve in the opposite direction, said servo-mechanism comprising a second pilot valve operable by said lateral accelerometer to provide further servo control signals, and a second actuator responsive to said further servo control signals to move the output member of said second servo-mechanism, said first pilot valve also being responsive to movement of said second servo-mechanism output member to vary said control signals so as to oppose the latter movement.

* * * * *

UNITED STATES PATENT AND TRADEMARK OFFICE
CERTIFICATE OF CORRECTION

PATENT NO. : 4,069,767
DATED : January 24, 1978
INVENTOR(S) : Stanley George Glaze It is certified that error appears in the above-identified patent and that said Letters Patent are hereby corrected as shown below:

[30] Foreign Application Priority Data
November 8, 1972   Great Britain..... 51477

Signed and Sealed this

Sixteenth Day of May 1978

[SEAL]

Attest:

RUTH C. MASON
Attesting Officer

LUTRELLE F. PARKER
Acting Commissioner of Patents and Trademarks